Figure 1:
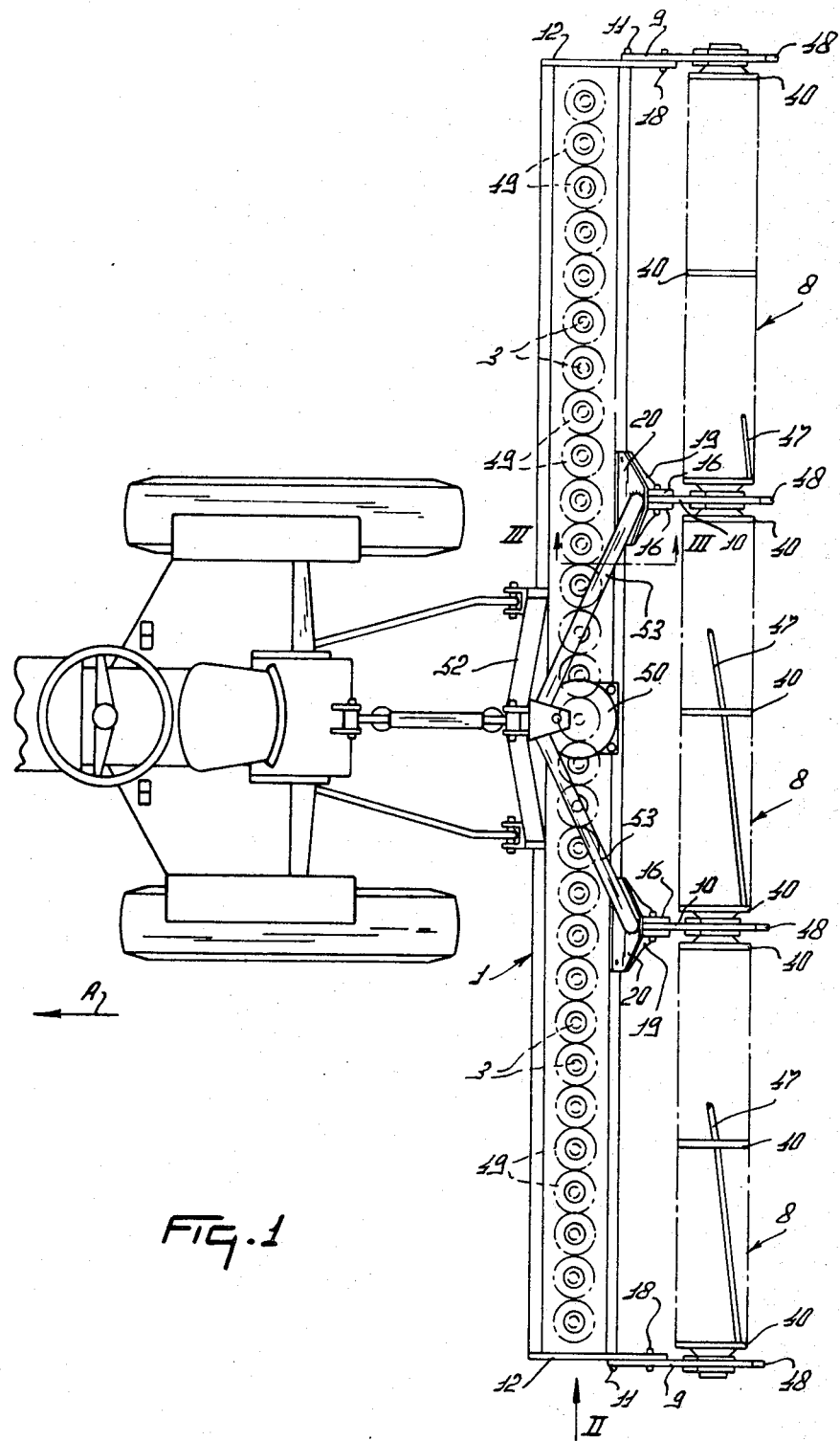

United States Patent [19]
van der Lely

[11] 4,271,911
[45] Jun. 9, 1981

[54] SOIL CULTIVATING MACHINES

[76] Inventor: Cornelis van der Lely, 7, Brüschenrain, Zug, Switzerland

[21] Appl. No.: 51,129

[22] Filed: Jun. 22, 1979

[30] Foreign Application Priority Data

Jun. 22, 1978 [NL] Netherlands ............... 7806736

[51] Int. Cl.³ ............................................. A01B 33/06
[52] U.S. Cl. ...................................... 172/68; 172/558
[58] Field of Search .................. 172/68, 47, 59, 69, 172/149, 150, 151, 169, 170, 173, 175, 177, 179, 421, 443, 532, 552, 553, 554, 121, 558, 559, 561, 610, 508; 238/272, 273, 63; 403/346, 347; 404/132; 248/49

[56] References Cited

U.S. PATENT DOCUMENTS

| 26,100 | 11/1859 | Giles et al. .................... 404/132 |
| 112,149 | 2/1871 | Keagy ............................. 172/172 |
| 594,238 | 11/1897 | Fisher ............................. 404/132 |
| 1,397,391 | 11/1921 | Adams ........................... 172/552 X |
| 1,545,564 | 7/1925 | Krotz .............................. 172/179 |
| 1,645,994 | 10/1927 | Lloyd ............................. 172/179 |
| 1,743,151 | 1/1930 | Malepsy ......................... 172/532 |
| 2,276,391 | 3/1942 | Hathorn ......................... 403/346 |
| 3,616,862 | 11/1971 | Lely ................................ 172/47 |
| 3,771,751 | 11/1973 | Derivaz ......................... 248/49 X |
| 3,835,933 | 9/1974 | Coski ............................. 172/508 X |
| 3,876,013 | 4/1975 | Dunn .............................. 172/150 X |
| 4,029,153 | 6/1977 | Lely ................................ 172/59 |
| 4,043,400 | 8/1977 | Lely et al. ...................... 172/59 X |
| 4,051,904 | 10/1977 | Lely et al. ...................... 172/47 X |

FOREIGN PATENT DOCUMENTS 30644 4/1920 Norway ............................. 404/132

OTHER PUBLICATIONS

Lelyterra Rotary Harrow Operators Manual & Parts List, Type 350-30 and 400-30, pp. 012 & 013, 11-1977.

Primary Examiner—Paul E. Shapiro
Attorney, Agent, or Firm—William B. Mason

[57] ABSTRACT

A cultivating machine has one or more trailing rollers that support the cultivating members at the desired height. Each roller has ends that are journalled via bearings to adjustable arms and the bearings are protected by profiled hoods having rims joined to scraping elements which fit within dished screens on the roller ends. The elements remain stationary while the screens rotate and the former conduct soil away from the bearings during operation. Each roller has support plates with circumferential recesses that receive elongated peripheral elements. The arms extend upwardly to the rear and their forward ends are pivoted to a frame portion. A forward coupling trestle has rear supports interconnected to the arms.

20 Claims, 11 Drawing Figures

SOIL CULTIVATING MACHINES

In known soil cultivating machines provided, inter alia, with a roller, the problem has tended to arise that, in use, the rotatable support of the roller becomes soiled to an extent such that the rotation of the roller is inhibited so that the roller tends to drag along, which is, of course, undesirable for obtaining a satisfactory effect.

According to the present invention there is provided a soil cultivating machine having a roller which is rotatably supported near one end, and a screening hood, for the rotatable support of the roller, the configuration of which is such that material penetrating inside the screening hood during operation of the machine is conducted out of the hood again.

In this way, even under most unfavourable conditions, the rotatable support of the roller is kept clear and a satisfactory operation of the roller can be ensured.

Figure 2:
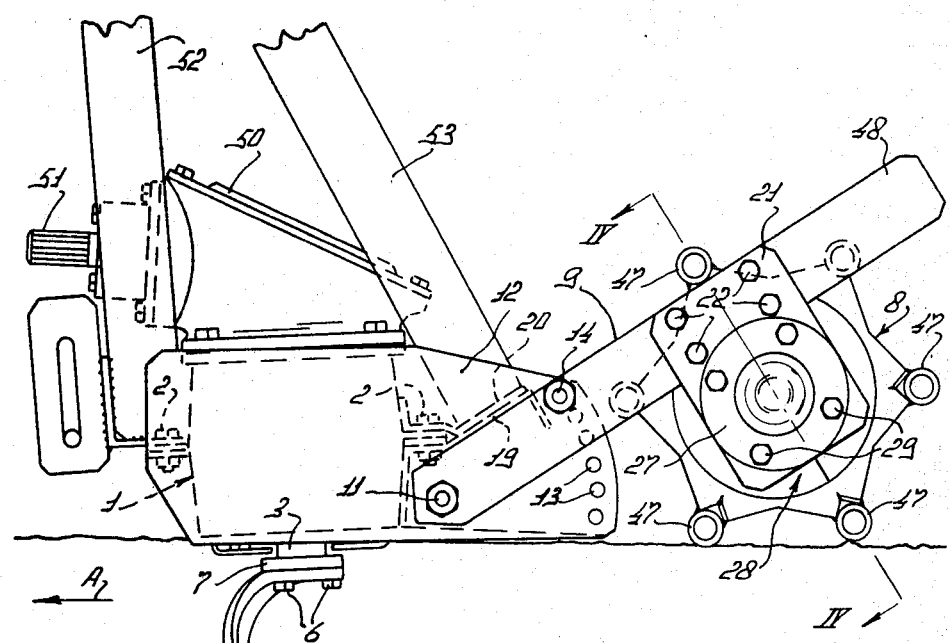
Figure 3:
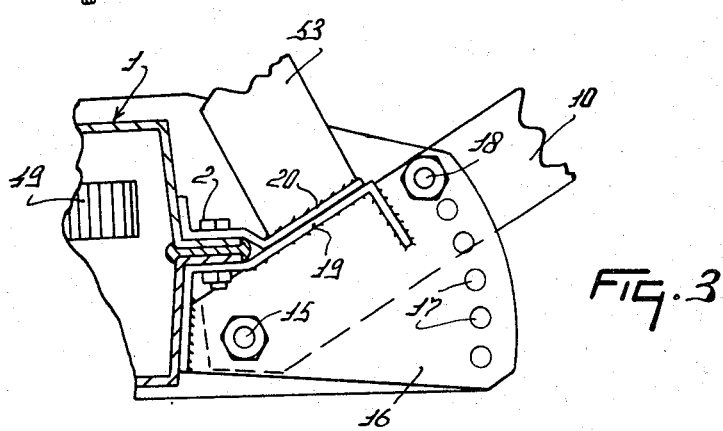
Figure 4:
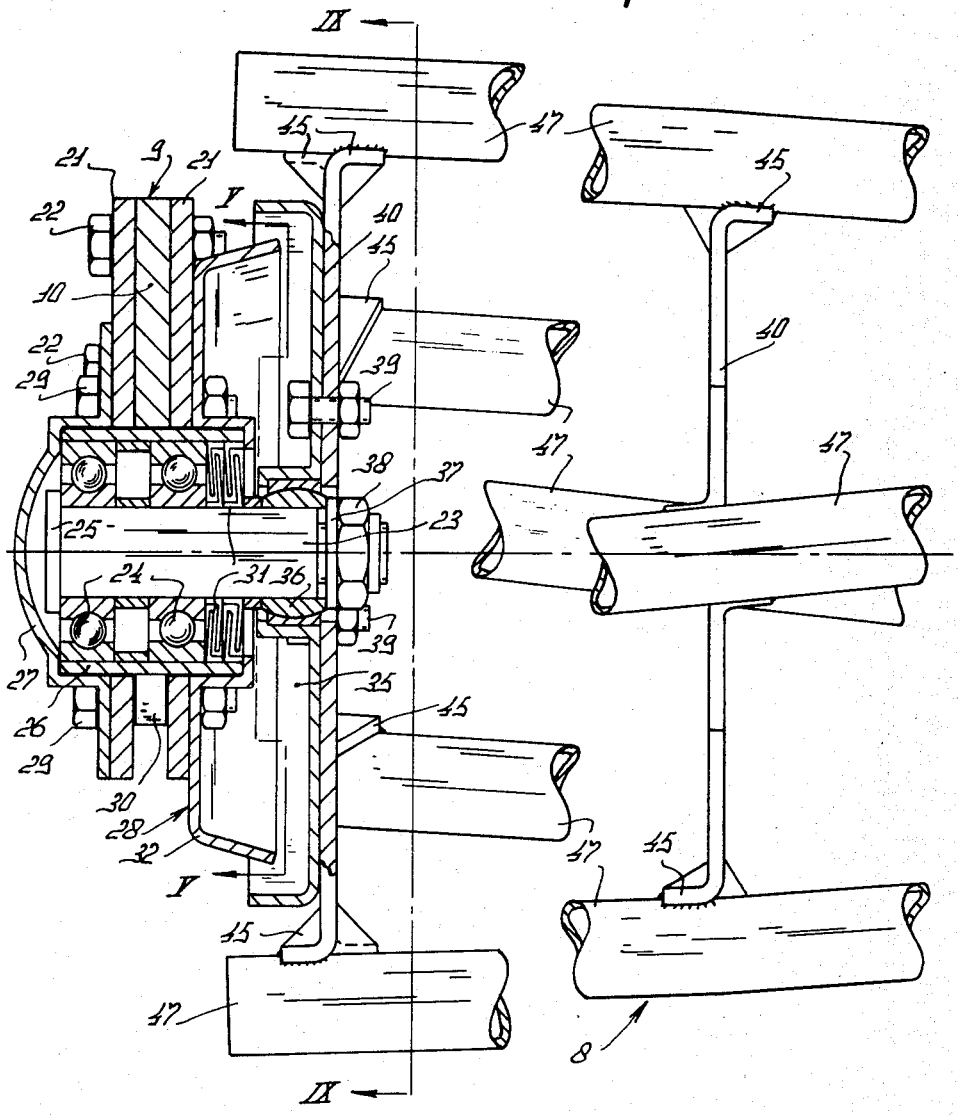
Figure 5:
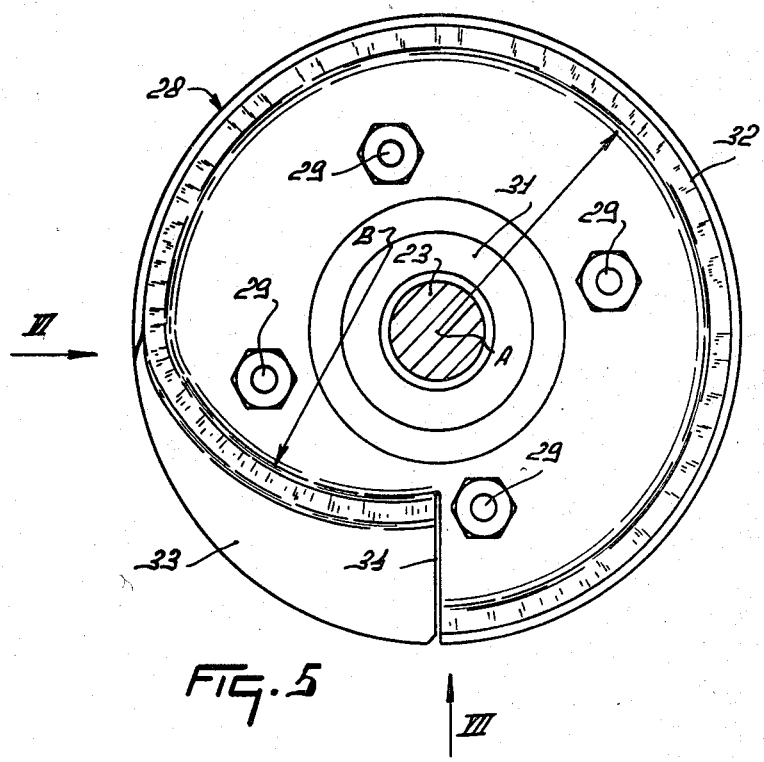
Figure 6:
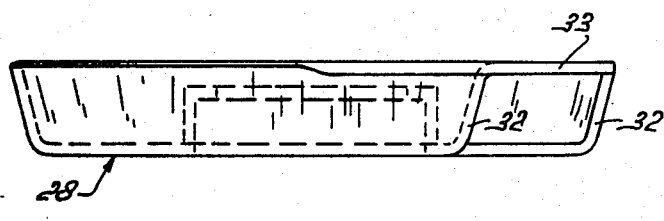
Figure 7:
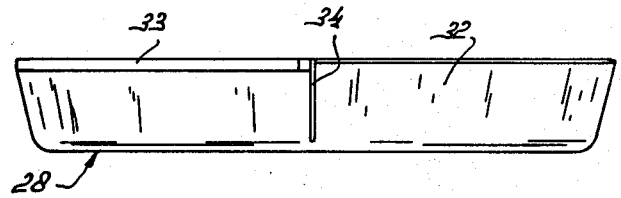
Figure 8:
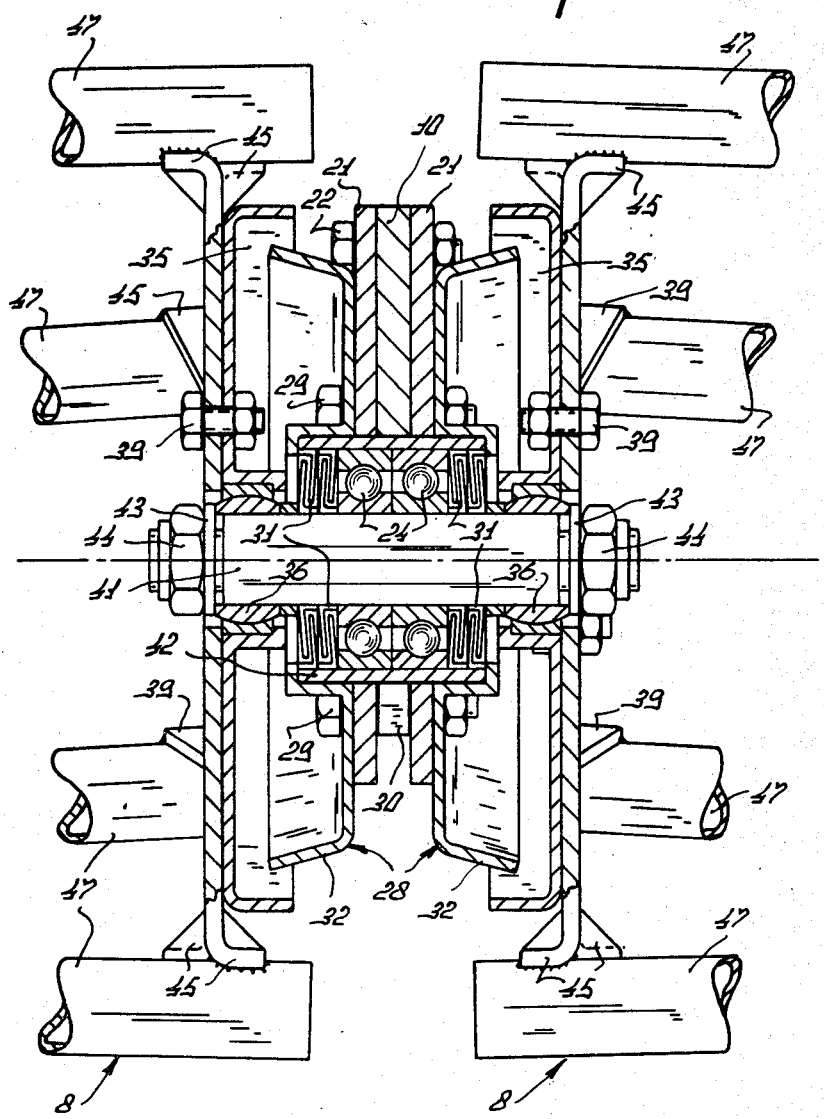
Figure 9:
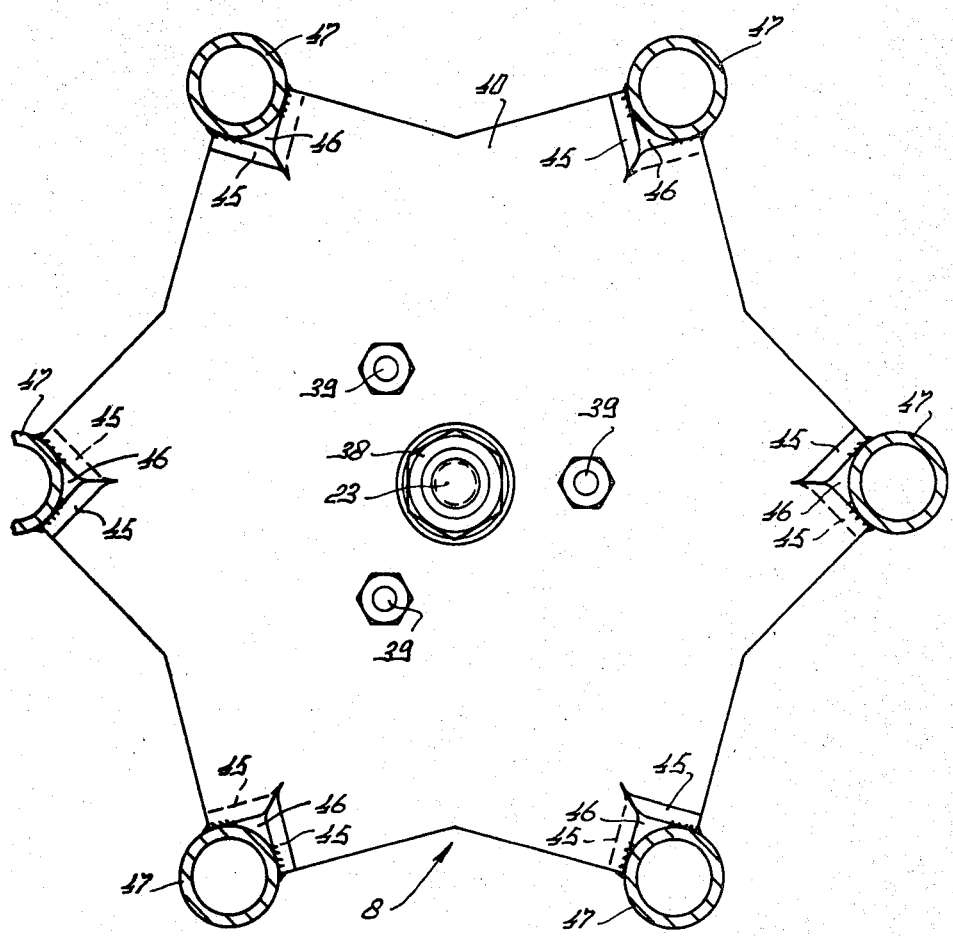
Figure 10:
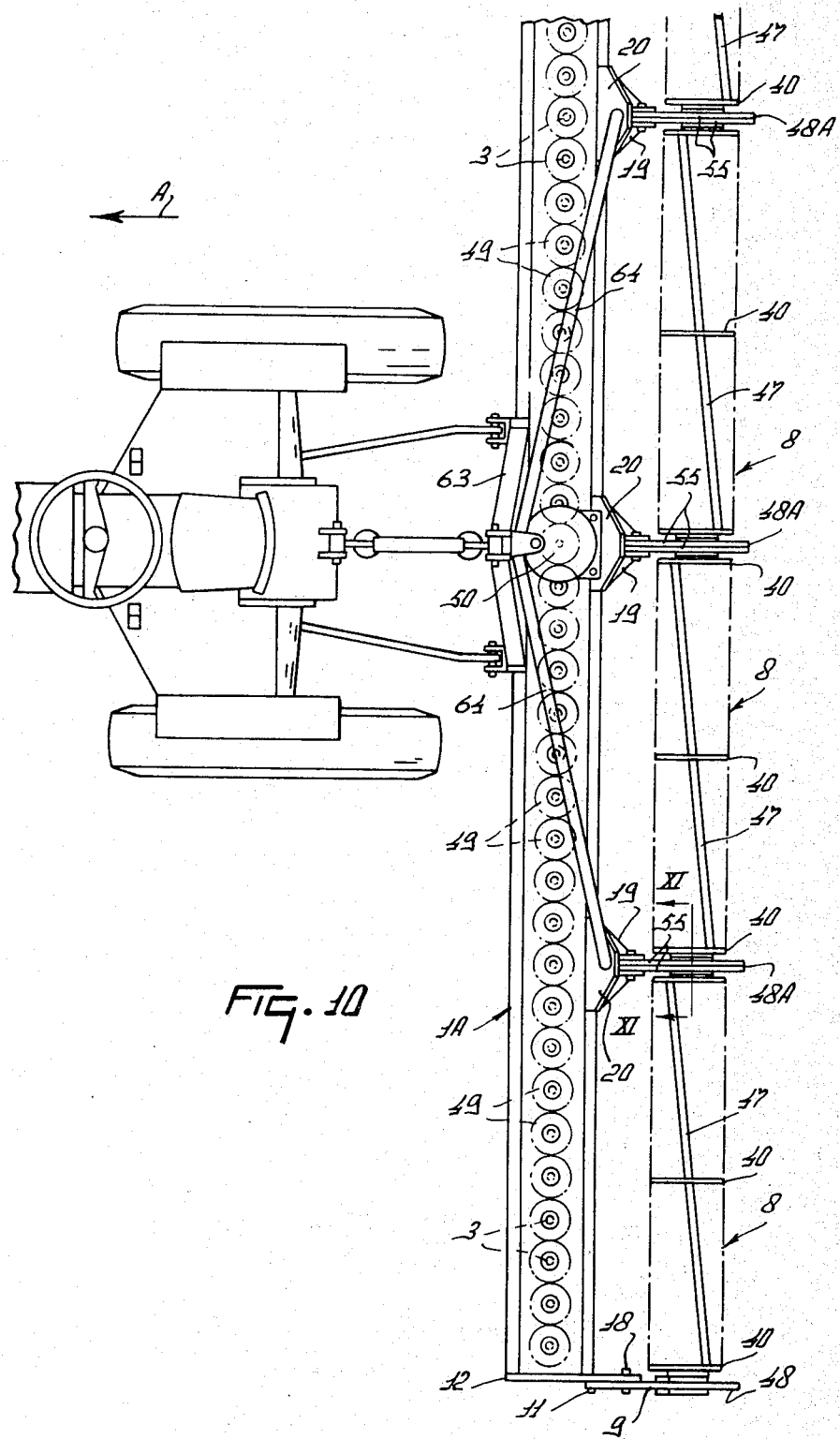
Figure 11:
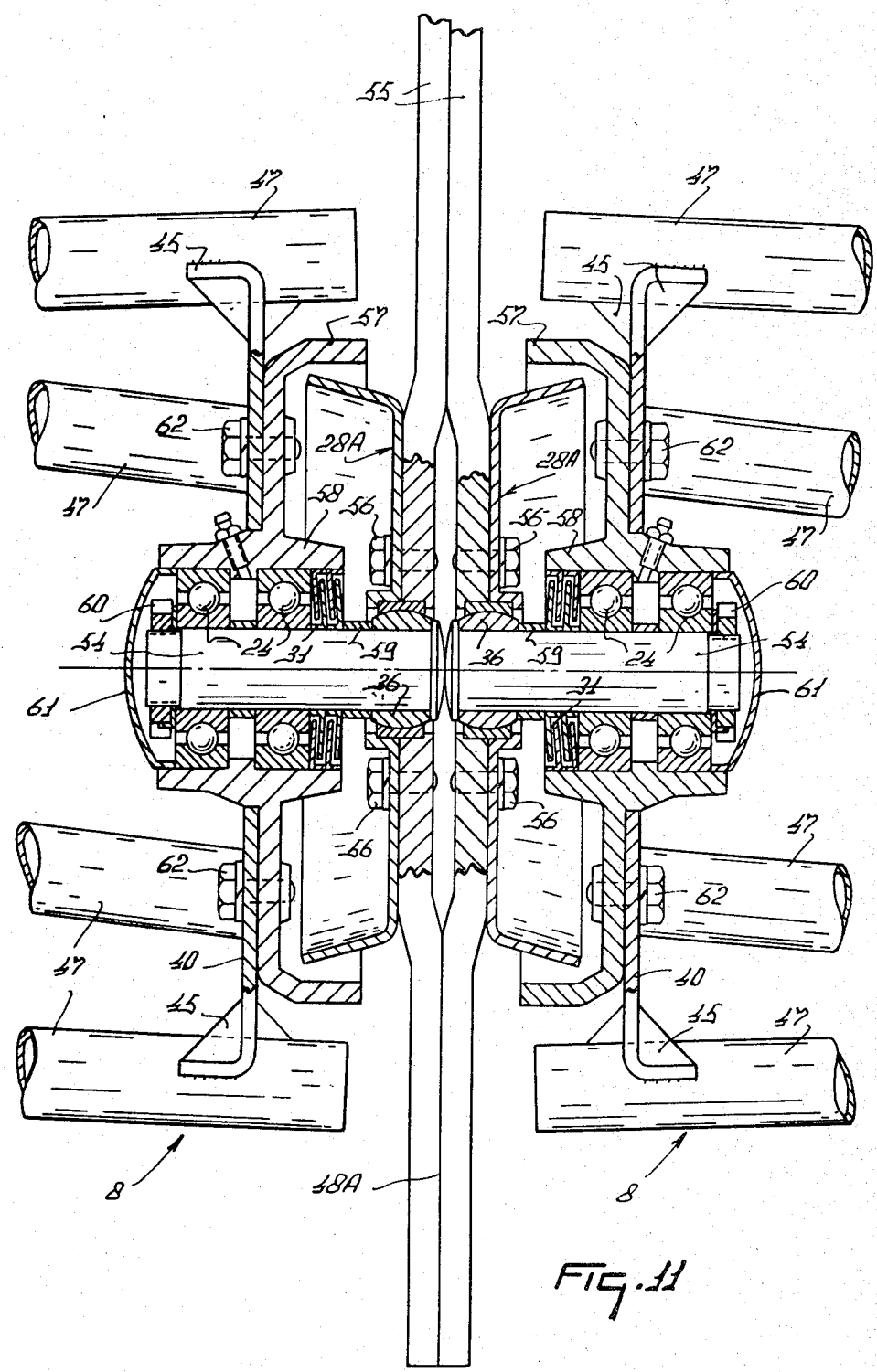

For a better understanding of the invention and to show how the same may be carried into effect reference will now be made, by way of example, to the accompanying drawings, in which:

FIG. 1 is a schematic plan view of a first form of soil cultivating machine,

FIG. 2 is a side view of the machine of FIG. 1, taken in the direction of arrow II in FIG. 1 and drawn to a larger scale, FIG. 3 is a sectional side view, on a still larger scale, taken on line III—III in FIG. 1, FIG. 4 is a sectional side view taken, on a larger scale, on the line IV—IV in FIG. 2, FIG. 5 is a sectional view taken on line V—V in FIG. 4, FIG. 6 is a view in the direction of arrow VI in FIG. 5, FIG. 7 is a view in the direction of arrow VII in FIG. 5, FIG. 8 shows on an enlarged scale and in section a bearing for the facing ends of two neighbouring rollers, FIG. 9 is a sectional view taken on line IX—IX in FIG. 4, FIG. 10 is a schematic plan view of part of a second form of soil cultivating machine, and FIG. 11 shows on an enlarged scale and in section a bearing for the facing ends of two neighbouring rollers of the machine shown in FIG. 10.

The soil cultivating machine illustrated in FIGS. 1 to 9 has a hollow frame portion 1 extending transversely of the intended direction of operative travel A of the machine and made-up of two identical parts clamped together along longitudinal rims. Packing material is sandwiched between these longitudinal rims and the parts are clamped together by bolts 2. The frame portion 1 supports substantially vertical shafts 3, forming parts of cultivating members 4. The longitudinal center lines of the shafts 3 are preferably spaced apart by a distance of 15 centimeters and during operation they are slightly inclined forward, preferably at an angle of about 5° to the vertical. Each of the cultivating members 4 is provided with only one tine 5, which is fastened by means of bolts 6 to a carrier 7 located at the lower end of the shaft 2 which projects out of the frame portion 1. Behind the cultivating members 4 there are three supporting members 8 in the form of rollers, which have identical structures and are supported in a pivotable manner with respect to the frame portion 1 by means of arms 9 and 10 with one arm 9 at each end of the frame portion 1 and the two arms 10 intermediate the arms 9. Each arm 9, 10 is pivotable and can be fixed in a selected one of a plurality of positions with respect of the frame portion 1. The outermost arms 9 are pivoted by means of bolts 11 directly behind the lower part of the frame portion 1 to upwardly directed plates 12 extending in the direction of travel A and closing the ends of the frame portion. The plates 12 extend beyond the rear of the frame portion 1 and each has near its rear edge a row of holes 13 located on the arc of a circle having its center on the longitudinal center line of the bolt 11 (FIG. 2). By means of a bolt 14, which can be passed through a hole in an arm 9 and through a selected one of the row of holes 13, each arm 9 can be set in position. The arms 10, located between the ends of the frame portion 1 and supporting the proximal ends of the respective rollers 8, are pivoted by bolts 15, whose longitudinal center lines are in line with those of the bolts 11, between upwardly extending plates 16 (FIG. 3). Near the rear edge of each plate 16 there is a row of holes 17 located on the arc of a circle having its center on the longitudinal center line of the bolt 15. Through a hole in the arm 10 and any one of the holes 17 a bolt 18 can be passed to set the arm 10 in position with respect to the frame portion 1. Each plate 16 is secured to a support 19 which is clamped by means of the bolts 2 against the lower part of the frame portion 1. The top of each plate 16 and each support 19 is in engagement with a plate 20 of substantially triangular shape, viewed in plan, which is clamped by the bolts 2 against the upper part of the frame portion 1.

Each of the arms 9 and 10 has just behind its center downwardly extending plates 21 which are substantially at right angles to the arm and which are secured in place on both sides of the arm (FIGS. 2, 4 and 8) by means of bolts 22. The plates 21 on each outermost arm 9 carry a stub shaft 23 supported in two relatively spaced ball bearings 24, the outermost of which bears on a shoulder 25 of the stub shaft. These bearings are accommodated in a bearing housing 26 which is held in aligned apertures in the plates 21 and the arm 9. The bearing housing 26 is held in place with respect to the plates 21 by means of a dust cap 27 at the outboard end of the stub shaft 23, and by being located in a recess in a screening hood 28 located on the roller side. The dust cap 27 as well as the screening hood 28 are held in place by means of bolts 29, which also serve to secure in place spacer sleeves 30 located between the plates 21. On the side of the screening hood 28 the bearing housing 26 is closed by a labyrinth seal 31. The recess in the screening hood 28 for holding the bearing housing 26 is located concentrically with the aperture for the stub shaft 23. Around this recess the wall of the screening hood 28 has a profile 32 which extends concentrically with the recess through 270° from an outer end and then inwardly along another circular arc through about 90°, the center of this arc being spaced from the center of the recess so that the profile terminates at an inner end located on the same radial line as the outer end with the two ends spaced apart from one another by a distance equal to about one quarter of the outside diameter of the screening hood (FIG. 5). The wall having the profile 32 has an outwardly inclined, bent-over rim. The portion 33 defined between the inwardly curved part of the wall having the profile 32 and the outermost periphery of the screening hood 28 as a whole is flat and is located at the level of the free edge of the bent-over rim (FIG. 6). The radially extending front edge 34 of this portion 33 constitutes a scraping element, the function of which will be explained hereinafter.

The wall having the profile 32 extends inside the rim of a screen 35, which rim is bent over substantially at right angles of the remainder of this screen. The screen 35 has a recess at its center accommodating a bearing 36, formed by a ball-and-socket joint, on the stub shaft 23. A closing plate 37 for guarding the assembly of ball bearings 24 and the bearing 36 is held in place on the bearing 36 by a nut 38 co-operating with a screw-thread on the inboard end of the stub shaft 23. The screen 35 is fastened by means of bolts 39 to the outer side of a supporting plate 40 located near the outboard end of the roller 8. The plate 40 has the shape of a six-pointed star (FIG. 9).

The plates 21 on the arms 10 for supporting the proximal ends of the rollers 8 hold, in the case of each arm 10, a single stub shaft 41 in two ball bearings 24 arranged in a bearing housing 42, which is held in place by means of screening hoods 28 on both sides of the supporting plates (FIG. 8). The bearing housing 42 is closed on each side by means of a labyrinth seal 31. On both sides of the bearing housing 42 the stub shaft 41 has a ball-and-socket joint bearing 26 for supporting one or other of the rollers 8 and in the same manner as for the stub shaft 23 this bearing 36 is accommodated in a screen 35, inside which is located the wall having the profile 32 of the respective screening hood 28. The respective bearings 24 and 36 are arranged on the stub shaft 41 between closing plates 43, which are held in place by means of nuts 44 co-operating with screwthreaded ends of the stub shaft 41.

Near its center each roller 8 has a further supporting plate 40 (FIG. 1). Each tip of each of the three star-shaped supporting plates 40 of each roller 8 is cut and the severed parts 45 are bent over at right angles in opposite senses (FIGS. 4, 8 and 9). The bent-over parts 45 thus provide V-shaped recesses 46 in which tubular, elongated elements 47 are secured around the circumference of the roller. Each tubular elongated element 47 runs along the length of the roller, with a slight kink near the center (FIGS. 1 and 4) so that the elements are disposed in substantially a helical fashion around the circumference of the roller in the manner illustrated in the Figures. The parts 45 permit simple and easy fastening of the respective elongated elements by welding during manufacture.

Rearwardly projecting free ends 48 of the arms 9 and 10 supporting the rollers 8 serve as handles that can be used for displacing the rollers 8 in a direction of height so that setting the arms 9 and 10 in position is considerably facilitated.

Inside the hollow frame portion 1 each of the shafts 2 of the cultivating members 3 is provided with a pinion 49 with the pinions on the shafts of neighbouring cultivating members drivably in mesh with one another. The shaft 2 of the cultivating member 3 near the center of the machine is prolonged upwards into a gear box 50, in which it is linked through a bevel transmission (not shown) to a shaft 51 projecting from the front of the gear box and connectable through an auxiliary shaft with the power take-off shaft of a tractor.

At the front the frame portion 1 is provided near the center with a trestle 52 for attaching the machine to the three-point lifting device of a tractor. The top of the trestle 52 is provided with downwardly diverging supports 53, which are secured to the upper faces of the plates 20 so that an additional support for the central arms 10 is obtained.

The machine described above, having a working width of about 4.50 meters, operates as follows.

During operation the machine is hitched by means of the trestle 52 to the three-point lift of a tractor and from the power take-off shaft of the tractor the respective cultivating members 3 are driven through the transmission described above in a manner such that neighbouring cultivating members rotate in opposite senses. The tines 5 of neighbouring cultivating members work overlapping strips of soil. The effective depth of the cultivating members 3 can be set with the aid of the three rollers 8 disposed in a line transverse of the direction of operative travel A so as to be rotatable about a common transverse axis. For this purpose the arms 9 and 10, after removal of the bolts 14 and 18 respectively, can be moved about the hinge bolts 11 and 15 with the aid of the handles 48, in a direction of height, and can be fixed in the desired position with the aid of the bolts 14 and 18. The earth thrown to the rear by the cultivating members, the shafts of which, as stated above, are slightly inclined forward, is captured by the respective rollers 8 and evenly distributed, after which it is packed during deposition. During operation the bearings of the stub shafts 23 and 41 of the rollers 8 are protected against penetration of earth and the like, since the screening hoods 28 detach any material that may penetrate within with the aid of the scraping element formed by the front edge 34 of the portion 33, the scraping element co-operating with the adjacent roller end and material being conducted away along the guide formed by the inwardly curved profile out of the stationary screening hood.

Jamming of the rollers during operation is thus effectively avoided in a simple manner, even if the working conditions are such that the machine is soiling heavily.

The machine of FIG. 10 has a larger number of cultivating members 3 so as to have a working width of about 6 meters. With this machine four rollers 8 of the same design as those described above are arranged behind the cultivating members 3. The outermost arm 9 support in the same manner as described above the outermost ends of the outermost rollers. In this machine, however, the proximal ends of the rollers 8 are each supported by a separate stub shaft 54 and a separate arm 55 (FIG. 11). The arms 55 are in contact with one another and have a kink at the level of the stub shafts 54 so that a space is formed for the interengaging flange-shaped ends of the stub shafts. Each of the stub shafts 45 is supported by means of a ball-and-socket joint bearing 36 in aperture in one or other of the arms 55. The bearings 36 are held in place by means of bolts 56 on screening hoods 28A arranged on the arms. These screening hoods are designed substantially like the screening hoods 28 already described and they also have a scraping element. The wall profile of each screening hood 28A extends inside the bent-over rim of a cast iron screen 57 each of which has a bearing housing 58 accommodating relatively spaced ball bearings 24 on the respective stub shaft 54. The ball bearings 24 are separated by means of a spacer sleeve 59 from the respective ball joints 36 and are held in place by means of a nut 60 co-operating with the screwthreaded end of the stub shaft 54. Each nut 60 is covered by a dust cap 61 bearing on the adjacent ball bearing and extending into the bearing housing 58. The screens 57 are fastened by means of bolts 62 to the outermost supporting plate 40 of the respective roller. In this machine the frame portion 1A is provided with a trestle 63 for attaching the machine to the three-point lift of a tractor, this trestle being fastened by means of supports 64 to the top faces of the plates 20 for holding the supporting arms of the proximal ends of the outer and inner rollers 8. Also this machine has handles for the supporting arms 55, designated by reference numeral 48A.

Since in the two machines described the rotatable support at the proximal ends of the rollers comprises a hinge joint formed by the ball-and-socket joint bearing 36, the support provided by the rollers is flexible and the machine can satisfactorily match the ground surface.

The support of the respective rollers 8 illustrated in FIG. 11 imparts a higher load resistance to the rollers, which is important for a machine of this width.

In each machine each screening hood has a form such that material penetrating into the interior of the hood during operation is conducted out of the hood.

While various features of the soil cultivating machines that have been described, and that are illustrated in the drawings, will be set forth in the following claims as inventive features it is to be noted that the invention is not necessarily limited to these features and that it encompasses all of the features that have been described both individually and in various combinations.

I claim:

1. A soil cultivating machine comprising a frame with cultivating means on said frame, at least one elongated roller connected to the frame at the rear thereof and said roller being positioned to provide support for said frame, the outer ends of said roller being journalled to arms with bearing means and said arms being connected to said frame, a screening hood surrounding said bearing means adjacent at least one end of said roller, said hood being dished and comprising an internal scraping element, said scraping element forming part of a profiled wall of said hood and said wall spiraling inwardly from an outer periphery of the hood, a screen on said one end of the roller and said screen being positioned adjacent said outer hood periphery, said hood, including said scraping element, being held stationary to cooperate with the rotating roller screen, whereby dirt is conducted out of the hood and away from said bearing means during operation.

2. A soil cultivating machine as claimed in claim 1, wherein said hood is circular and the profile of wall covers an angle of about 270° along said outer periphery.

3. A soil cultivating machine as claimed in claim 2, wherein ends of said wall are located substantially on a common radial line passing through the center of said hood and said scraping element is positioned between said wall ends.

4. A soil cultivating machine as claimed in claim 3, wherein an inner one of the wall ends is located substantially midway between the center of said hood and the outer periphery of the hood.

5. A soil cultivating machine as claimed in claim 1, wherein said hood is circular and the screen has a rim bent over towards said hood to surround said outer hood periphery, the wall of said hood being located within said rim.

6. A soil cultivating machine as claimed in claim 5, wherein there are two neighboring rollers positioned side-by-side, the rotary axes of said rollers being aligned and the proximal roller outer sides being pivotally supported by respective ball joints, respective hoods cooperating with corresponding screens adjacent said proximal sides.

7. A soil cultivating machine as claimed in claim 6, wherein the proximal ends of said two rollers are supported by common arm means and bearing means on a common stub shaft.

8. A soil cultivating machine as claimed in claim 7, wherein the arm means supporting the proximal ends of the two rollers is pivoted to said frame portion by support means and said support means comprising part of a trestle for coupling said machine with a tractor.

9. A soil cultivating machine as claimed in claim 6, wherein said proximal ends of said rollers are supported by a separate respective stub shaft and a separate corresponding arm for each roller.

10. A soil cultivating machine as claimed in claim 5, wherein said one roller end is supported by a stub shaft passing through said hood and said shaft is journalled to an arm through said bearing means.

11. A soil cultivating machine as claimed in claim 10, wherein said stub shaft is journalled in said arm on two ball bearings arranged in a housing and said housing is held on one side in a recess in said hood.

12. A coil cultivating machine as claimed in claim 10, wherein said roller is supported on said stub shaft by a ball joint.

13. A soil cultivating machine as claimed in claim 11, wherein said ball joint is supported by a further recess in said screen.

14. A soil cultivating machine as claimed in claim 5, wherein said roller comprises supporting plates and elongated elements are fastened to said plates to form the circumference of the roller, said screen being secured to an outer plate adjacent said one end of the roller.

15. A soil cultivating machine as claimed in claim 14, wherein each supporting plate has a plurality of bent-over parts at its circumference, said elongated elements being secured to said parts.

16. A soil cultivating machine as claimed in claim 15, wherein each bent-over part forms a V-shaped recess in which an elongated element is received and fastened.

17. A soil cultivating machine as claimed in claim 16, wherein said recess is defined by two adjacent, bent-over parts that extend in opposite directions.

18. A soil cultivating machine as claimed in claim 17, wherein said support plate has the shape of a star with a recess at each tip thereof, and the parts are bent over towards different sides of said star.

19. A soil cultivating machine as claimed in claim 1, wherein there are a plurality of rollers positioned side-by-side and arm means connect the proximal sides of the rollers to the frame, said arm means extending upwardly to the rear from pivot connections to the frame, said pivot connections being to plate means fixed to the frame and said plate means including at least one fastener that interconnects the arm means to the plate means in any one of a plurality of different settings whereby the supporting level of said roller can be changed.

20. A soil cultivating machine as claimed in claim 1, wherein said wall has an outwardly inclined rim bent over towards said one end of said roller, and said scraping element is flat, said element extending to the level of said bent-over rim.

* * * * *